US010408270B2

United States Patent
Looijmans

(10) Patent No.: US 10,408,270 B2
(45) Date of Patent: Sep. 10, 2019

(54) MOUNTING DEVICE FOR A ROLLING ELEMENT BEARING HAVING NO OUTER RACE

(71) Applicants: ZF Friedrichshafen AG, Friedrichshafen (DE); ZF WIND POWER ANTWERPEN N.V., Lommel (BE)

(72) Inventor: Danny Looijmans, Neerpelt (BE)

( * ) Notice: Subject to any disclaimer, the term of this patent is extended or adjusted under 35 U.S.C. 154(b) by 486 days.

(21) Appl. No.: 15/031,772

(22) PCT Filed: Oct. 8, 2014

(86) PCT No.: PCT/EP2014/071492
§ 371 (c)(1),
(2) Date: Apr. 25, 2016

(87) PCT Pub. No.: WO2015/067425
PCT Pub. Date: May 14, 2015

(65) Prior Publication Data
US 2016/0245342 A1  Aug. 25, 2016

(30) Foreign Application Priority Data
Nov. 8, 2013  (DE) .................. 10 2013 222 766

(51) Int. Cl.
*F16C 35/06*  (2006.01)
*B25B 27/06*  (2006.01)
(Continued)

(52) U.S. Cl.
CPC .............. *F16C 43/04* (2013.01); *B25B 27/06* (2013.01); *F16C 35/06* (2013.01); *F16C 19/386* (2013.01);
(Continued)

(58) Field of Classification Search
CPC .. F03D 7/02; F16C 43/04; F16C 35/06; F16C 2300/14; F16C 19/386; F16C 2360/31; B25B 27/06; F16H 2057/085
See application file for complete search history.

(56) References Cited

U.S. PATENT DOCUMENTS 3,336,652 A * 8/1967 Ullmo .................... B25B 27/02
29/254
3,722,064 A * 3/1973 Spontelli ............... B21K 25/00
29/237
(Continued)

FOREIGN PATENT DOCUMENTS

CN       202579057 U    12/2012
CN       202785289 U     3/2013
(Continued)

OTHER PUBLICATIONS

German Search Corresponding to 10 2013 222 766.3 dated Mar. 19, 2014.
(Continued)

*Primary Examiner* — Ryan J. Walters
*Assistant Examiner* — Lawrence Averick
(74) *Attorney, Agent, or Firm* — Davis & Bujold PLLC; Michael J. Bujold

(57) ABSTRACT

A device for introducing at least one roller bearing without any outer race into a gearwheel. The device has a supporting element, a member that is fixed on the supporting element for attaching the supporting element to a crane, at least two fixing elements which are fixed onto the supporting element and can be moved together and apart radially relative to a reference axis. The fixing elements can be moved toward one another and introduced into an inner race of the roller bearing. The fixing elements are designed to fix at least the inner race of the roller bearing when, after being introduced into the inner race, they are moved apart. A base element can
(Continued)

be placed onto the gearwheel. The supporting element is attached on the base element in such a manner that the support element can move axially relative to the reference axis.

6 Claims, 1 Drawing Sheet

(51) Int. Cl.
    *F16C 43/04*     (2006.01)
    *F16H 57/08*     (2006.01)
    *F16C 19/38*     (2006.01)

(52) U.S. Cl.
    CPC ...... *F16C 2360/31* (2013.01); *F16C 2361/61* (2013.01); *F16H 2057/085* (2013.01)

(56) References Cited

U.S. PATENT DOCUMENTS

| | | | |
|---|---|---|---|
| 5,442,854 A * | 8/1995 | Koltookian | B23P 19/02 29/244 |
| 6,665,919 B1 * | 12/2003 | Kurtz | B25B 27/023 269/3 |
| 7,996,972 B2 * | 8/2011 | Hu | B25B 27/026 29/252 |
| 2004/0134053 A1 * | 7/2004 | Klann | B25B 27/062 29/259 |
| 2010/0251528 A1 * | 10/2010 | Hu | B25B 27/026 29/252 |
| 2011/0083306 A1 * | 4/2011 | Olberding | F16K 31/055 29/240 |
| 2013/0152353 A1 * | 6/2013 | Hu | B25B 27/023 29/261 |

FOREIGN PATENT DOCUMENTS

| | | |
|---|---|---|
| CN | 202936093 U | 5/2013 |
| DE | 1 804 296 | 1/1960 |
| DE | 1 888 001 | 2/1964 |
| DE | 196 11 605 A1 | 9/1997 |
| DE | 20 2007 016 624 U1 | 5/2008 |
| DE | 20 2009 000 526 U1 | 4/2009 |
| DE | 20 2013 004 938 U1 | 9/2013 |
| JP | 2006-329331 A | 12/2006 |
| JP | 2007-263305 A | 10/2007 |

OTHER PUBLICATIONS

International Search Corresponding to PCT/EP2014/071492 dated Jun. 24, 2015.
Written Opinion Corresponding to PCT/EP2014/071492 dated Jun. 24, 2015.

* cited by examiner

MOUNTING DEVICE FOR A ROLLING ELEMENT BEARING HAVING NO OUTER RACE

This application is a National Stage completion of PCT/EP2014/071492 filed Oct. 8, 2014, which claims priority from German patent application serial no. 10 2013 222 766.3 filed Nov. 8, 2013.

FIELD OF THE INVENTION

The invention concerns a device for introducing roller bearings having no outer race into a gearwheel, in particular a planetary gearwheel of a wind power transmission.

BACKGROUND OF THE INVENTION

For the mounting of planetary gearwheels of a planetary stage of a wind power transmission, conical roller bearings in an O-arrangement have been found particularly advantageous. In this case the bearings of the planetary gearwheels are designed without an outer race. Instead, the outer bearing surface of the bearings are formed by the planetary gearwheels, i.e. in each case an outer race of a bearing and a planetary gearwheel are integrated in one piece.

During assembly the bearings, consisting of an inner race, the rolling elements and a bearing cage, are first introduced into the planetary gearwheels. Together with the bearings the planetary gearwheels are positioned on the planetary carrier so that the fitting of the planetary bolts can take place.

The introduction of the bearings into the planetary gearwheels has been found problematic. Since the rolling elements in wind power machines are very large and correspondingly heavy, there is a risk that the outer bearing surfaces of the bearings in the planetary gearwheels may be damaged. In particular, the current prior art provides no way of preventing small dents and scratches from being produced in the bearing surfaces during assembly. During the operation of a wind power machine such defects can develop into bearing damage and therefore increase the risk of failure.

SUMMARY OF THE INVENTION

The purpose of the present invention is to introduce a roller bearing having no outer race into a gearwheel, such as a planetary gearwheel of a wind power transmission, while avoiding the disadvantages inherent in the prior art. In particular, during this process damage of the gearwheel should be avoided.

Correspondingly, a device according to the invention serves for introducing at least one roller bearing without an outer race into a gearwheel. The roller bearing has an inner race, rolling elements and a bearing cage, but no outer race. The inner race forms the inner bearing surface of the roller bearing; the outer bearing surface is formed by the gearwheel. In particular, the roller bearing can be a conical roller bearing. The device is particularly suitable for introducing the roller bearing into a planetary gearwheel of a planetary stage of a wind power transmission.

According to the invention, the device comprises a supporting element. To this are fixed means for attachment to a crane. The hooks of the crane can for example be engaged with the supporting element so that the device can be lifted by means of the crane.

In addition at least two fixing elements are attached to the supporting element. These can be displaced radially toward and away from one another in relation to a reference axis. The reference axis can be chosen freely, but is preferably selected such that it can be brought into coincidence with the rotational axes of the roller bearing and the gearwheel. Radially toward and away from one another in relation to a reference axis means, the fixing elements have in each case exactly one translational degree of freedom and/or exactly one rotational degree of freedom. In the case of the translational degree of freedom, at least one direction vector of translational movement of each fixing element extends radially relative to the reference axis. The translational movement can take place both in the direction of the reference axis, i.e. toward the reference axis, and also in the opposite direction from the reference axis, i.e. away from the reference axis.

Alternatively or in addition to the translational degree of freedom, the fixing elements can each have exactly one rotational degree of freedom about a rotational axis that extends antiparallel to the reference axis. In other words the rotational axis is inclined relative to the rotational axis by an angle different from zero. Preferably, the rotational axis extends perpendicularly to the reference axis.

If the fixing elements are pushed together, i.e. both moved in the direction of the reference axis, they can then be introduced into an inner race of the roller bearing. Here, introduced into the inner race means introduced into the space enclosed or surrounded by the inner race. For this, it is preferable to use the crane.

Thus, the device is suspended from the means for attachment to the crane, and lifted. Then, the device is moved by means of the crane in such manner that the fixing elements enter the inner race of the roller bearing.

The fixing elements are designed to fix the inner race of the roller bearing when, after being introduced into the inner race, they are pushed apart, i.e. when in their condition of having been introduced into the inner race they are pushed apart or both moved away from the reference axis.

Depending on the design of the roller bearing, the bearing cage and the rolling elements are fixed on the inner race. In that case it is sufficient to exclusively fix the inner race by means of the fixing elements in order to lift the roller bearing by means of the device. Otherwise, the fixing elements are preferably designed such that they can fix not only the inner race of the roller bearing, but also the bearing cage and/or the bearing elements. As a rule it suffices to fix the inner race and the bearing cage exclusively, since the rolling elements are held by the bearing cage.

For fixing the inner race and/or the bearing cage and/or the rolling elements, hook-shaped, in particular L-shaped fixing elements have been found advantageous.

Moreover, the device comprises a base element that can be put onto the gearwheel. The base element therefore serves for placing the device onto the gearwheel.

The supporting element is attached to the base element so that it can move axially relative to the reference axis. This means that the supporting element can move by translation relative to the base element along the reference axis or parallel to the reference axis. The movement can take place in two directions. Thus, the supporting element can move downward, i.e. toward the base element, and upward or in the opposite direction from the base element, i.e. away from the base element.

In a preferred embodiment of the invention, the base element comprises at least one means for positioning the base element on the gearwheel radially relative to the reference axis. In particular, the means serve for positioning, namely for positioning the device and/or the roller bearing fixed by means of the fixing elements on the gearwheel, radially relative to the reference axis. Preferably, the positioning is carried out in such manner that the roller bearing is centered in the gearwheel, i.e. the rotational axis of the roller bearing is brought into line with the rotational axis of the gearwheel so that the two rotational axes coincide.

For positioning the base element and/or the device and/or the roller bearing, the positioning means can comprise at least one surface which makes contact at least at three points and preferably all the way round with the tooth crowns of the gearwheel. The contact points between the positioning means and the tooth crowns preferably lie in the circumferential direction of the reference axis, i.e. concentrically to the reference axis. Analogously, the surface of the positioning means also preferably extends in the circumferential direction of the reference axis, i.e. concentrically with it. The surface of the positioning means can in particular be the lateral surface of a truncated cone. This has the advantage that not only is the base element held in a centered position, but also that when being placed onto the gearwheel it is guided to that position if it is initially in an off-center position.

When the fixing elements have fixed the roller bearing, the base element is placed on the gearwheel and then the supporting element is displaced axially relative to the reference axis in the direction toward the base element, whereby the roller bearing moves to its target position within the gearwheel. During this the roll elements come into contact with the outer bearing surface of the roller bearing that extends within the gearwheel. To prevent the bearing surface and/or the rolling elements from being damaged during this, in a further preferred embodiment the device has at least one damper. This is designed such that a displacement of the supporting element toward the base element, in particular axially relative to the reference axis, can be damped. This means that the damping effect of the damper opposes the displacement of the supporting element toward the base element or is directed against that displacement. To prevent damage to the roller elements and/or the outer bearing surface, the damping effect must act, in particular, when the rolling elements come into contact with the outer bearing surface. Preferably, the damping effect begins before the rolling elements come into contact with the outer bearing surface, so that displacement of the supporting element can be delayed sufficiently.

In a further preferred embodiment, a mechanism for adjusting the fixing elements comprises a disk that can rotate about the reference axis. Thus, the rotational axis of the disk and the reference axis are identical. The disk is preferably part of the supporting element and is mounted to rotate on another part of the supporting element.

The disk comprises means for guiding the fixing elements, whose effect is that by rotating the disk the fixing elements are pushed toward and away from one another. By rotating the disk in a first direction the fixing elements are pushed toward one another; by rotating the disk in a second direction the fixing elements are pushed apart.

As means for guiding the fixing elements, the disk preferably has long, narrow, spiral-shaped elevations—such as rails—depressions—such as grooves—, flutings, notches or channels—, or perforations—such as slots or openings. The elevations, depressions or perforations extend in each case along a spiral path. In turn, the spiral preferably runs round the reference axis. The fixing elements are engaged with the elevations, depressions or perforations. Consequently, rotation of the disk displaces the fixing elements radially relative to the reference axis.

In a method according to the invention for introducing the roller bearing into the gearwheel, the device according to the invention is first attached to the crane. For that purpose the above-mentioned means are provided on the supporting element. The supporting element must be moved in the opposite direction from the base element, i.e. away from the base element. This is preferably done by the crane. When the device is lifted by the crane, the force of gravity acts on the base element, bringing about the desired movement.

Using the crane, the fixing elements are then pushed inside the inner race of the roller bearing. For this, the fixing elements have to be pushed toward one another. Accordingly, if necessary a process step "pushing the fixing elements together radially relative to the reference axis" takes place. To introduce the fixing elements, the roller bearing is preferably positioned in such manner that the rotational axis of the roller bearing is directed perpendicularly or vertically.

In a further process step the fixing elements introduced into the inner race of the roller bearing are pushed apart from one another in such manner that they fix at least the inner race.

After that, the base element is placed onto the gearwheel by means of the crane. The gearwheel too is preferably so positioned that its rotational axis is directed perpendicularly or vertically. The base element is placed on the gearwheel in that the crane lifts the device and lowers it onto the gearwheel. When it is placed on the gearwheel, the base element and/or the device and/or the roller bearing is/are positioned radially relative to the reference axis.

By moving the supporting element in the axial direction relative to the reference axis in the direction of the base element, i.e. toward the base element, the roller bearing can now be introduced into the gearwheel. The movement of the supporting element and the roller bearing preferably takes place under the force of gravity.

To remove the device, the fixing elements are then pushed toward one another. The device is removed because when the fixing elements are pushed together, they move clear of the inner race of the roller bearing. The crane then lifts the device and the roller bearing remains in the gearwheel.

BRIEF DESCRIPTION OF THE DRAWINGS

An example embodiment of the invention, as described below, is illustrated in the figures which show, in detail.

DETAILED DESCRIPTION OF THE PREFERRED EMBODIMENTS

Figure 1:
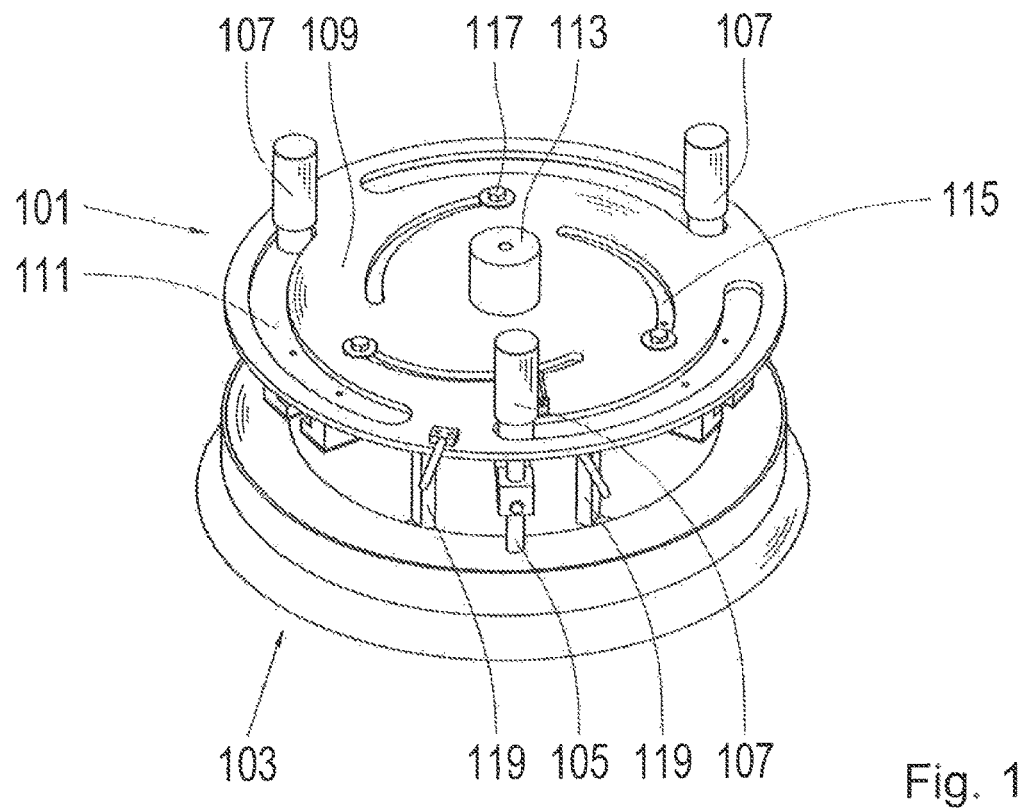
FIG. 1: A device according to the invention, seen from above.

FIG. 1 shows a device with a supporting element 101 and a base element 103. Columns 105 serve to position the supporting element 101 relative to the base element 103. The columns 105 are firmly anchored in the base element 103. The supporting element 101 has holes through which the columns 105 pass. Above the supporting element 101 the columns 105 are fitted with stop buffers 107. If the supporting element 101 is moved in the direction opposite from the base element 103, i.e. away from the base element 101, the supporting element 101 comes into contact with the stop buffers 107. Thus, the stop buffers restrict the mobility of the supporting element 101 in the direction away from the base element 103.

The supporting element 101 comprises a disk 109, which is mounted to rotate on a baseplate 111. On the disk 109 is fixed a means 113 for attaching to a crane. The disk 109 also comprises three elongated, spiral-shaped slots 115. In the slots 115 are screw-bolts 117, each screwed into a fixing element 119. In this way the fixing elements 119 are guided along the slots 115.

Figure 2:
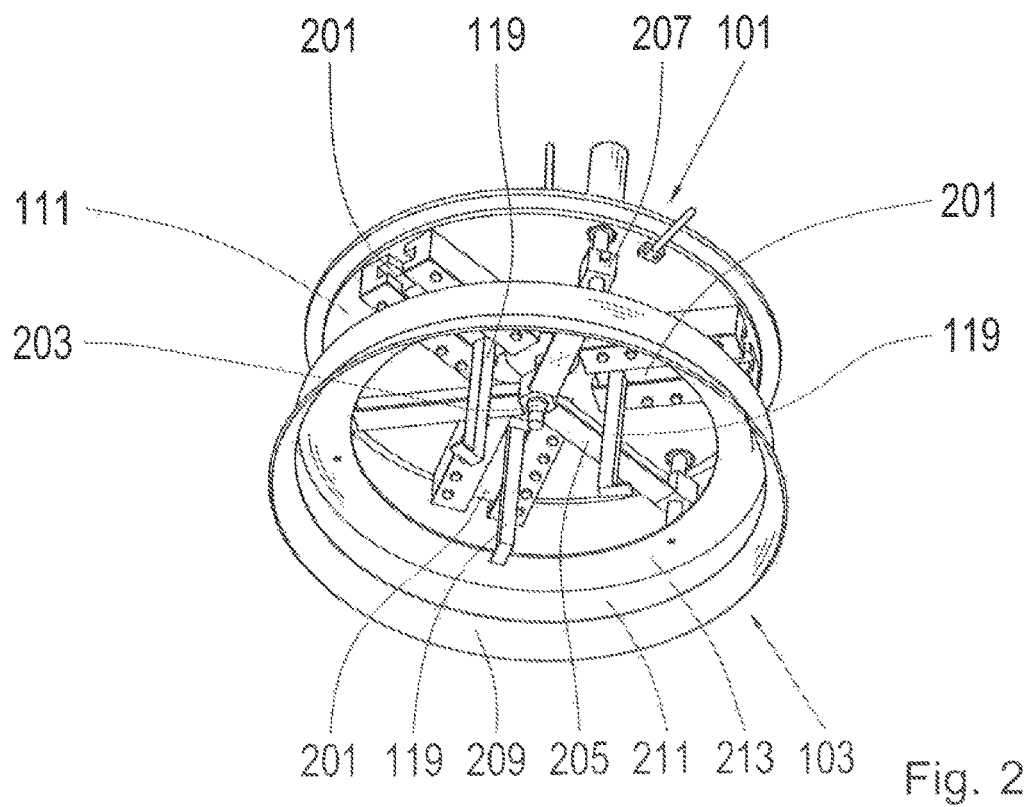
FIG. 2: A device according to the invention, seen from below.

As shown in FIG. 2, the fixing elements 119 are also guided in each case along a rail 201 in the radial direction. The rail 201 is attached under the baseplate 111. In this way a mechanism is produced, by virtue of which, rotation of the disk 109 relative to the baseplate 111 brings about a displacement of the fixing elements 119 in the radial direction.

Between the supporting element 101 and the base element 103 there is a damper 203. The damper 203 is attached to the columns 105 by means of three cross-members 205. When it moves downward or toward the base element 103, the supporting element 101 comes against the damper 203. Consequently, the movement of the supporting element 101 is slowed down.

To be able to adapt the damping action of the damper 203 to the roller bearing and planetary gearwheels to be fitted, the height of the cross-members 205 on the columns 105 can be adjusted at the fixing points 207. Thus, the adjustment of the damper 203 takes place axially in relation to the same reference axis relative to which the supporting element 101 can also be displaced.

The base element 103 has three functional surfaces. A first functional surface 209 is in the form of a lateral surface of a truncated cone. The first functional surface 209 serves to center the device when it is placed on the gearwheel so that the rotational axes of the gearwheel and the roller bearing are brought into coincidence.

A second functional surface 211 is provided in order to keep the device in its centered position once it has been placed on the gearwheel. The second functional surface 211 is directed parallel to the reference axis and extends concentrically thereto. A lateral surface of a cylinder describes the shape of the second functional surface 211.

A third functional surface 213 has the shape of a circular ring that extends concentrically around the reference axis. The third functional surface 213 serves to fix the base element 103 in the axial direction relative to the reference axis once the base element has been placed on the gearwheel, so that the supporting element 101 with the roller bearing can be moved axially relative to the reference axis in the direction toward the base element 103.

INDEXES

101 Supporting element
103 Base element
105 Column
107 Stop buffer
109 Disk
111 Baseplate
113 Attachment means
115 Slot
117 Screw bolt
119 Fixing element
201 Rail
203 Damper
205 Cross-member
207 Fixing point
209 First functional surface
211 Second functional surface

The invention claimed is:

1. A device for introducing at least one roller bearing without any outer race into a gearwheel, the device comprising:
   a supporting element which defines a central reference axis;
   a means fixed to the supporting element for attaching the supporting element to a crane;
   at least two fixing elements being connected to the supporting element such that the at least two fixing elements are axially fixed relative to the supporting element, and the at least two fixing elements being radially movable together and apart relative to the central reference axis, the at least two fixing elements being radially movable toward one another and introduced radially within an inner race of the roller bearing;
   the at least two fixing elements being designed to fix at least the inner race of the roller bearing when, after being introduced radially within the inner race, the fixing elements are moved apart; and
   an annular base element being coaxially aligned with the supporting element and the central reference axis, the annular base element being positionable on the gearwheel, and the supporting element being attached on the annular base element in such a manner that the supporting element is axially movable along the central reference axis, relative to the annular base element, into a position in which the at least two fixing elements are radially within the annular base element.

2. The device according to claim 1, wherein the annular base element comprises at least one annular surface for positioning the annular base element on the gearwheel radially relative to the central reference axis, and the at least one annular surface being concentric to the central reference axis.

3. The device according to claim 1, further comprising at least one damper being axially arranged between the supporting element and the annular base element, and the at least one damper dampens movement of the supporting element in a direction toward the annular base element.

4. The device according to claim 1, further comprising a disk that is rotatable about the central reference axis for adjusting the at least two fixing elements, and
   the disk comprises a means for radially guiding the fixing elements relative to the central reference axis, the means for guiding the fixing elements are designed so that by rotating the disk , the means for guiding the fixing elements displaces the fixing elements radially one of toward one another and apart from one another.

5. The device according to claim 4, wherein the disk has, as the means for radially guiding the fixing elements, at least one of elongated, spiral-shaped slots.

6. A device for introducing at least one roller bearing without any outer race into a gearwheel, the device comprising:
   a supporting element having an attachment member fixed thereto, and the attachment member facilitates securing the supporting element to a crane, and the supporting element defining a central reference axis;
   at least two fixing elements being movably coupled to the supporting element such that the at least two fixing elements are radially movable, relative to the central reference axis, both toward each other and away from each other, and such that the at least two fixing elements and the supporting element are axially fixed relative to each other, and the at least two fixing elements being receivable radially within an inner race of the roller bearing when the at least two fixing elements are radially moved toward one another;

the at least two fixing elements fixing at least the inner race of the roller bearing when, after being introduced into the inner race of the roller bearing, the at least two fixing elements are moved apart from each other; and an annular base element being positionable on the gearwheel, and the supporting element being attached to the annular base element such that the supporting element and the annular base element are concentric with the central reference axis and the supporting element is axially movable along the central reference axis relative to the annular base element, and the supporting element being axially movable such that the at least two fixing elements are receivable within the annular base element.

* * * * *